Oct. 31, 1944.   P. ORLICH ET AL   2,361,703
ECHO SOUNDING DEVICE
Filed Nov. 14, 1940
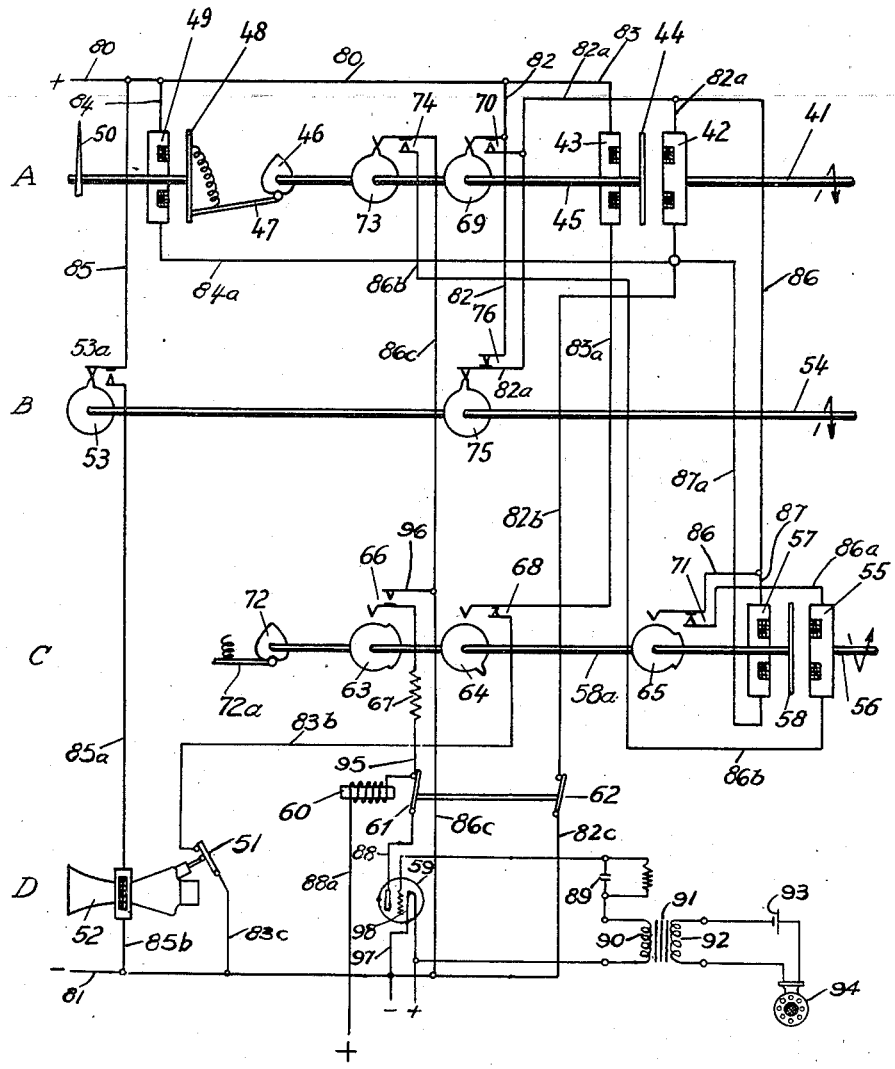
INVENTORS
PETER ORLICH
GÜNTHER NEGEL
HANS HARTZ.
BY Knight Bros
THEIR ATTORNEYS Patented Oct. 31, 1944

2,361,703

UNITED STATES PATENT OFFICE 2,361,703

ECHO SOUNDING DEVICE

Peter Orlich, Günther Negel, and Hans Hartz, Kiel, Germany; vested in the Alien Property Custodian Application November 14, 1940, Serial No. 365,647
In Germany May 27, 1939

6 Claims. (Cl. 177—386)

This invention pertains to an echo sounding apparatus of the type comprising measuring mechanism which travels at a constant rate during the period between the emission of a sound signal and the return of the echo and which gives an indication at the time the echo returns and is subsequently restored to starting position. In this type of apparatus difficulties in the timing of the periodic cycle arise if the same measuring system having but one range is used for greater and lesser depths. The reasons for the difficulties are that the travel of the emitted sound through shallow water takes a relatively short time, and therefore the reflected sound, i. e., the echo, is received rather quickly, whereas the travel of the sound through deep water takes much longer. In contrast to this, the return of the measuring mechanism to its zero position is effected in a shorter time, when greater depths are measured than when lesser depths are measured, since the return movement of the measuring mechanism during the cycle is effected by rotation of the shaft of said mechanism in the same direction as the indicating movement. In other words, the conditions under which greater and lesser depths, respectively, are measured, are very different with respect to the intervals between sound emission and reception of echo at which the indicating pointer is stationary and also with respect to the periods for the zero return. If the apparatus of the prior art has been designed for use over a relatively wide range of depths and the starting of the return movement of the mechanism to zero is set at a definite time interval after the sending of the signal, where shallow depths are encountered, a relatively long period of waiting is required after reception of the echo. To be more specific, on the one hand, a relatively long waiting interval is necessary in the indicating position of the pointer to permit return to zero of the measuring mechanism in order that a succeeding signal shall not be sent out before the echo of a preceeding signal has been received, on the other hand, a relatively long waiting interval is required in the zero position when deep waters are measured, since said interval has to compensate the longer time for the return movement of the measuring mechanism, when lesser depths are measured. For the same reasons a rather slow succession of sound emissions has been provided in such apparatus working with constant speed and having but one range.

In the echo sounding device in accordance with the present invention, the above waste in waiting time intervals in the measuring cycles is avoided and quicker succession of soundings made possible by combining a detaining relay with the measuring apparatus, said relay initiating the return of the measuring mechanism to zero upon receipt of the echo while the pointer is maintained stationary in its indicating position. The operation of said system is such that at the instant, when the echo is received and thereby the measuring step of the measuring mechanism of one cycle is terminated, said measuring mechanism is detained in its position for such time interval as to allow the local indicator, which is connected to said measuring mechanism over a follower member, to follow the movement of said measuring mechanism and to set in the angular position of the latter. The local indicator may be coupled with a transmission means for remotely controlling another indicator or other indicators at distant places. In the example shown and described in detail, the rapidity of soundings is assumed to be constant. It is, however, possible to provide automatic or hand controlled means for varying the speed of the shaft actuating the sound emitting switch in the new system. Furthermore, the sound switch controlling the sound emission may be arranged in such a manner that it is actuated again immediately upon the return of the measuring apparatus to zero position. The conformance of the sequence of soundings to the elevation to be measured can thereby take place continuously or intermittently.

The invention will be described in detail by reference to the accompanying drawing, which shows diagrammatically one illustrative form of the apparatus.

This apparatus comprises a timing and indicating mechanism A, a signal repeater B, i. e. a timer for successive signals, a detaining mechanism C, and a signal and echo receiving mechanism D. Electric current for operating the various mechanisms is supplied by positive and negative mains 80 and 81. The timing mechanism is a known time interval measuring device, shown, for example, in the Patent No. 2,032,893 to Bernhard Settegast and Wilhelm Rudolph, which comprises a constantly running rotary magnet 42 mounted upon a shaft 41 rotating at constant speed, and opposite the running magnet a holding magnet 43. The running magnet 42 is connected with the mains in a circuit comprising conductors 82, 82a, 82b, and 82c, while the holding magnet 43 is connected in a circuit comprising the conductors 83, 83a, 83b, and 83c. The wires 82 and 82a can be connected together by either of two parallel switches 70 and 76. The switch 70 is held open in the zero position of shaft 45 by a cam 69. Upon an axially shiftable shaft 45 there is fastened an armature disk 44 between the magnets 42 and 43, which are separated by a narrow air gap. Upon the shaft 45 of armature disk 44 is fixed a heart cam 46, acting through a spring-influenced control arm 47 to set an indicator armature disk 48, in the manner shown in Fig. 4 of the copending application of Peter Orlich and Hans Hartz, Ser. No. 285,310, filed July 19, 1939. The showing of this mechanism in the drawing of the present application is diagrammatic. The armature disk 48 can be held stationary by a locking magnet 49, whereby a pointer 50 fixed rigidly to the armature disk 48 is locked. The locking magnet 49 is connected in parallel to the running magnet 42 by conductors 84 and 84a. The pointer 50 can be made as a stationary indicator itself, or it can be constructed as a control device for operating an auxiliary indicating device, by means of electrical remote control, in a manner not illustrated in the drawing, but shown in the above-mentioned copending application, Serial No. 285,310.

The timer or repeater mechanism B comprises a constantly rotating shaft 54 bearing a cam disk 53 which operates a switch 53a controlling the circuit of a sound emitter 52, including conductors 85, 85a, and 85b. The sound emitter 52 may be one of the kind shown in Fig. 3 of our copending application, Serial No. 365,646, filed November 14, 1940. The sound emitter circuit is preferably controlled by switch 53a through a relay, in a manner not shown in the drawing, but which will be readily understood. A cam 75 on shaft 54 is adapted to close normally open switch 76 at the time the sound emitter is operated by switch 53a.

The detaining mechanism C comprises a time interval determining device, comprising a constantly running rotary magnet 55 mounted on a drive shaft 56 running at constant speed, a holding magnet 57, and a disk armature 58 fixed to an axially shiftable shaft 58a. The running magnet is connected in a circuit comprising conductors 82, 86, 86a, 86b and 86c. The conductors 86b and 86c are connected together during the operating part of the cycle by a switch 74, which is held open by a cam 73 on shaft 45, however, when the latter is in zero position. The holding magnet 57 is connected in parallel to the running magnet 42 by conductors 86, 87 and 87a. The shaft 58a has fixed to it cams 63, 64 and 65 to operate switches 66, 68 and 71 in a manner to be described presently. The switch 71 is normally closed to connect conductors 86 and 86a together. The switch 68 is normally closed to connect conductors 83a and 83b together. The shaft also has fixed to it a heart cam 72 coacting with a spring-influenced arm 72a in a manner which tends to return the shaft to a certain zero position, when the armature 58 is released by the demagnetization of both magnets 55 and 57.

The signal control and echo receiving devices D include, in addition to the signal emitter 52, a starting switch 51, which may be a pneumatic switch such as the switch 38 in Fig. 3 of our copending application Serial No. 365,646. The starting switch 51 is operated by, or simultaneously with the signal emitter 52 and controls the circuit of holding magnet 43, to set the measuring mechanism in operation. A switch 62 controlling the circuits of running magnet 42 and holding magnets 49 and 57 is operated by a relay magnet 60, jointly with a holding switch 61. The relay magnet 60 and its holding switch 61 are in the plate circuit of an electron tube 59, this circuit including conductors 88a, 88, filament 98 and conductor 97. The grid circuit of this tube includes a grid condenser 89 and the secondary winding 90 of a transformer 91, the primary winding 92 of which is in circuit with a galvanic cell 93 and a sound responsive transmitter 94. The combination just described constitutes an echo receiver unit of the kind disclosed in the above-mentioned Settegast and Rudolph Patent No. 2,032,893. The relay magnet 60 is also included in a circuit controlled by switch 66 and comprising conductor 88a, a conductor 95 containing a resistance 67, a conductor 96, and conductor 86c.

The apparatus is shown in its starting position at the instant the repeater cam 53 has opened switch 53a to energize the sound emitter 52. At this time, which terminates the condition of rest of the apparatus, the holding magnet 43 of the measuring mechanism stands energized through its circuit 83, 83a, 83b, 83c, switches 51 and 68 being closed, and shaft 45 is thereby held at zero position. In the condition of rest of the apparatus prior to the signal emission, switches 76 and 70 are both open and the circuits of running magnet 42 of the measuring mechanism and holding magnet 57 of the detaining mechanism are broken. The circuit of running magnet 55 of the detaining mechanism is broken by switch 74. The shaft 58a is held in position of rest by heart cam mechanism 72, 72a. The relay 60 is excited through its circuit running from the positive source through conductor 88a, the relay magnet 60, switch 61, conductor 88, plate to filament of electron tube 59, thence to negative main 81; thus the relay magnet holds closed switch 62, partially completing the circuits of running magnet 42 and holding magnet 57. The circuit of locking magnet 49 is closed through conductors 84, 84a, 82b, switch 62 and conductor 82c, thus retaining the pointer 50 in its previously set position.

Just prior to the actuation of switch 53a by cam 53, the cam 75 closes switch 76 and thus excites the running magnet 42 of the measuring mechanism and holding magnet 57 of the detaining mechanism through circuits 82, 82a, 82b, 62, 82c, and 82, 82a, 86, 87, 87a, 82b, 62, 82c. The armature 44 remains attracted by holding magnet 43, but armature 58, which has been free, is attracted by holding magnet 57 and held in its normal angular position shown. At the instant that the signal is emitted switch 51 is momentarily opened and the circuit of holding magnet 43 is broken, which allows the armature 44 to jump to the previously energized running magnet 42. As soon as armature 44 begins to turn, switch 70 closes, completing holding circuits for the running magnet 42 and holding magnet 57. At the same moment the switch 74 is closed, completing the energizing circuit of running magnet 55 through conductors 82, 82a, 86, 86a, 86b, and 86c. The armature disk 58 does not jump to the running magnet 55, having been previously attracted by the holding magnet 57. This condition continues until the echo is received by the microphone 94, at which time simultaneously the shaft 45 of the measuring mechanism 42—44 is stopped and the shaft 58a of the detaining mechanism is started. This occurs, according to the example illustrated, through the effect of the echo upon the grid charge of the electron tube 59, which reduces the current in the plate circuit of the electron tube and demagnetizes relay 60 sufficiently to allow the switches 61 and 62 to drop open. The opening of switch 61 cuts out completely the exciting current of relay 60, while switch 62 opens the circuits of the running magnet 42 of the measuring mechanism and the holding magnet 57 of the detaining mechanism. Hereby the armature disk 44 of the measuring mechanism is attracted by the holding magnet 43, the switch 51 having meanwhile closed, and is instantly stopped, locking the heart cam 46 in an angular position which corresponds to the time interval between the signal emission and the echo reception. If this position is different from the one which controlled the previous setting of the pointer 50, the spring of lever 47 is under tension, tending to pull the disk 48 toward the new setting. The circuit of holding magnet 49 is broken by switch 62 simultaneously with the openig of the circuit of running magnet 42, so that the armature disk 48 is released and allowed to assume the new position corresponding to the setting of heart cam 46, moving with it the pointer 50. This completes the measuring phase of the cycle, during which the measuring shaft 45 has been revolving at a uniform rate from zero position, from the instant the signal was emitted till the instant the echo was received. The angular distance travelled by the shaft is thus proportional to the elevation of the apparatus above ground and is indicated by the pointer 50.

The detaining phase of the cycle overlaps the last portion of the measuring phase, during which the pointer 50 is brought to the new position. In fact it is the function of the detaining phase to defer the return to zero position of the measuring shaft 45 just long enough to allow the pointer to be reset. Accordingly the detaining mechanism is set in operation at the instant the echo is received and, at the end of a predetermined time interval, starts the return to zero of the measuring shaft. The opening of switch 62 breaks not only the circuits of running magnet 42 and holding magnet 49, but also the circuit of holding magnet 57 of the detaining mechanism. The running magnet 55 having been excited by closure of switch 74 when shaft 45 began to rotate, armature 58 jumps to the running magnet, when the holding magnet 57 is deenergized, and shaft 58a is set in rotation at the speed of the running magnet. Cams 63, 64 and 65 become operative upon their respective switches successively. Cam 63 first closes switch 66, which applies voltage to relay 60 through the circuit comprising conductors 88a, 95, resistance 67, and conductors 96 and 86c thereby exciting the relay. Switches 61 and 62 are thus closed and the holding circuit of relay 60 through tube 59 is restored to ready condition. The closure of switch 62 completes the circuit of holding magnet 49, locking the armature disk 48 and its pointer 50. The closure of switch 62 also reenergizes running magnet 42 of the measuring mechanism and holding magnet 57 of the detaining mechanism, but no change in the positions of the armatures 44 and 58 follows at this time. Shortly after, the cam disk 64 momentarily opens switch 68, breaking the circuit of holding magnet 43 and allowing armature 44 to jump back to the running magnet 42, previously excited by closure of switch 62. This terminates the detaining phase of the cycle and starts the zero setting phase. The rotation of shaft 45 recommences and continues until cam 69 raises switch 70 and interrupts the circuit of running magnet 42, which occurs when the shaft 45 has returned to zero or starting position. The circuit of holding magnet 43 having been reestablished by closure of switch 68 after its momentary opening, the armature 44 jumps to the holding magnet and holds the shaft 45 in starting position.

Meanwhile, the detaining mechanism 55—58 is restored to starting position in the following manner: Upon the closure of switch 62 the circuit of holding magnet 57 was completed and this magnet reenergized, but without effect, at that time upon armature 58, which was held by running magnet 55. A short time after the cam disk 64 again sets in operation the measuring mechanism shaft 45, by opening switch 68 and thus deenergizing holding magnet 43, as above described cam disk 65 opens switch 71, breaking the circuit of running magnet 55 and allowing the armature 58 to jump to the holding magnet 57, which had been reenergized by closure of switch 62. The armature 58 and its shaft 58a are held stationary until shaft 45 reaches the starting position shown in the drawing, at which time the circuit of holding magnet 57 is broken by the opening of switch 70 and the circuit of running magnet 55 is additionally opened at both switches 71 and 74. The armature 58 being now freed from both magnets 55 and 57, the heart cam mechanism 72, 72a, turns the shaft 58a, with its cams 63, 64, 65, back to starting position. The closure of switch 71, as cam 65 moves away from it, is without effect, because the circuit of running magnet 55 is open at switches 70 and 74. The whole apparatus is now again in ready position.

This conception for eliminating the waste time delay is obviously not limited to the illustrative example. The example itself, in the first place, can be changed in a number of respects. For instance, the shafts 41 and 56, or even all the shafts 41, 54 and 56, can be driven in common.

Finally, all these devices can be used in any kind of echo sounding apparatus, which operate by the method of returning to zero position. They are therefore not limited to acoustical soundings, but can also be used with advantage, for example, for electromagnetic echo soundings.

We claim:

1. In an echo sounding device, sound transmitting means, echo receiving means, time interval measuring means adapted to run through a cycle of operation and back to starting position, indicating means, means controlled by said measuring means for setting said indicating means, means for locking said indicating means in set position, means for simultaneously operating said sound transmitting means and starting said measuring means on its cyclical run, means operated by said echo receiving means to detain said measuring means in the course of its cyclical run for a predetermined period to permit said indicating means to move to a position corresponding to the position of the measuring means, and means for releasing said locking means during the period of detention of said measuring means to allow said indicating means to assume a new setting under the control of said measuring means.

2. An echo sounding device as described in claim 1, wherein said means for detaining said measuring means for a predetermined period comprises holding means for holding said measuring means stationary, a rotary cam device, means operated by said echo receiving means to render said holding means effective upon said measuring means and to set in operation said rotary cam device, and means operated by said cam device after a predetermined angular movement thereof to release said holding means to permit said measuring means to continue its cyclical run.

3. An echo sounding device as described in claim 1, wherein said means for detaining said measuring means for a predetermined period comprises holding means made effective by said echo receiving means to hold said measuring means stationary; and a time interval determining device comprising a constantly running rotary magnet, a holding magnet, a rotary armature mounted between said magnets so as to be axially shiftable from one to the other, said armature being normally held stationary by said holding magnet, means controlled by said echo receiving means for causing said armature to shift from said holding magnet to said running magnet, and cam means driven by said armature to cause said measuring means to be released from said holding means to continue its cyclical run.

4. In an echo sounding device, indicating means, sound emitting means, echo receiving means, a time interval measuring device comprising a holding magnet, a constantly running rotary magnet, and a rotary armature axially shiftable between said magnets, setting means for said indicating means movable cyclically by said armature through a series of positions back to starting position, means for locking said indicating means in set position, means for simultaneously energizing said sound emitting means and causing said armature to jump to said running magnet, relay controlled switch means operated by said echo receiving means to cause said armature to jump from said running magnet to said holding magnet, a time interval determining device, means whereby said last device is set in operation by said echo receiving means simultaneously with the jump of said armature to said holding magnet, means operated by said time interval determining device after a predetermined interval to cause said armature to jump back to said running magnet, and means operated by said armature upon reaching starting position to cause said armature to jump back to said holding magnet.

5. In an echo sounding device, indicating means, sound emitting means, echo receiving means, a time interval measuring device comprising a holding magnet, a constantly running rotary magnet, and a rotary armature axially shiftable between said magnets, setting means for said indicating means movable cyclically by said armature through a series of positions back to starting position, an electromagnet for locking said indicating means in set position, circuit means for connecting said holding magnet to a source of exciting current, to hold said armature normally in starting position, circuit means for connecting said running magnet with said source of current; means for simultaneously causing an operation of said sound emitting means and momentarily opening the circuit of said holding magnet, to allow said armature to jump to said running magnet; relay controlled switch means operated by said echo receiving means to break the circuit of said running magnet to allow said armature to return to said holding magnet, and to break the circuit of said locking magnet to allow said indicating means to assume a new position under the influence of said setting means, a time interval determining device, means whereby said last device is set in operation by the opening of said relay controlled switch means, means operated by said time interval determining device to restore said relay controlled switch means to re-establish the circuits of said running magnet and said locking magnet, means operated by said time interval determining device after a predetermined interval from its start to break the circuit of said holding magnet momentarily to allow said armature to jump back to said running magnet, and means operated by said armature upon reaching starting position to break the circuit of said running magnet, whereby said holding magnet becomes effective to attract and hold said armature in starting position.

6. In an echo sounding device, indicating means, sound emitting means, echo receiving means, a time interval measuring device comprising a holding magnet, a constantly running rotary magnet, and a rotary armature axially shiftable between said magnets, setting means for said indicating means movable cyclically by said armature through a series of positions back to starting position, electromagnetic indicator locking means for holding said indicating means in set position; circuit means for connecting said holding magnet to a source of exciting current, to hold said armature normally in starting position; circuit means for connecting said running magnet with said source of current; means for simultaneously causing an operation of said sound emitting means and momentarily opening the circuit of said holding magnet, to allow said armature to jump to said running magnet; relay controlled switch means operated by said echo receiving means to break the circuit of said running magnet to allow said armature to return to said holding magnet, and the circuit of said indicator locking magnet to allow said indicating means to assume a new position under the influence of said setting means; a time interval determining device, comprising a second holding magnet, a second constantly running rotary magnet, and a second rotary armature axially shiftable between said second magnets; circuit means whereby said second holding magnet is excited and demagnetized in conjunction with the excitation and demagnetization of said first running magnet; circuit means whereby said second running magnet is excited after said second holding magnet has been excited, whereby upon demagnetization of said second holding magnet simultaneously with the demagnetization of said first running magnet said second armature is attracted to said second running magnet, means operated by said second armature for restoring said relay controlled switch means to re-excite said first running magnet, said second holding magnet, and said locking magnet; means operated subsequently by said second armature momentarily to break the circuit of said first holding magnet, to allow said first armature to jump back to said first running magnet; means operated by said second armature subsequently, to break the circuit of said second running magnet and allow said second armature to return to said second holding magnet; means operated by said first armature upon reaching starting position to break the circuits of said first running magnet and said second holding magnet, whereby said first armature jumps back to said first holding magnet and said second armature is freed, and means for restoring the freed second armature to starting position.

PETER ORLICH.
GÜNTHER NEGEL.
HANS HARTZ.